United States Patent
Suzuki et al.

(10) Patent No.: US 6,498,215 B2
(45) Date of Patent: Dec. 24, 2002

(54) RESIN COMPOSITION COMPRISING VINYL CYCLIC HYDROCARBON POLYMER AND A COMPOUND HAVING AN ALCOHOLIC HYDROXY GROUP AND AN ESTER LINKAGE

(75) Inventors: Teruhiko Suzuki, Kanagawa (JP); Tsutomu Nagamune, Kanagawa (JP); Teiji Kohara, Kanagawa (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/990,418

(22) Filed: Nov. 21, 2001

(65) Prior Publication Data

US 2002/0032265 A1 Mar. 14, 2002

Related U.S. Application Data

(62) Division of application No. 09/463,552, filed as application No. PCT/US98/03358 on Jul. 28, 1998, now Pat. No. 6,365,660.

(30) Foreign Application Priority Data

Jul. 28, 1997 (JP) .............................................. 9-217171
Aug. 19, 1997 (JP) .............................................. 9-237647
Oct. 23, 1997 (JP) .............................................. 9-309240

(51) Int. Cl.$^7$ ............................. C08J 9/00; C08L 25/04; C08L 25/06; C08L 25/08; C08L 71/12
(52) U.S. Cl. ....................... 525/191; 525/199; 525/210; 525/211; 525/213; 525/217; 525/221; 525/222; 525/232; 525/233; 525/236; 525/238; 525/239; 525/240; 525/241
(58) Field of Search .................... 525/191, 199, 525/210, 211, 213, 217, 221, 222, 232, 233, 236, 238, 239, 240, 241

(56) References Cited

U.S. PATENT DOCUMENTS 4,847,150 A 7/1989 Takeda
5,362,805 A * 11/1994 St. Clair ..................... 525/65
6,005,050 A 12/1999 Okada et al.
6,048,932 A 4/2000 Okada et al.

FOREIGN PATENT DOCUMENTS

| EP | 0317263 | 5/1989 |
|---|---|---|
| JP | 60-13836 | 1/1985 |
| JP | 63-43910 | 2/1988 |
| JP | 1-132603 | 5/1989 |
| JP | 6-199950 | 7/1994 |
| JP | 7-76657 | 3/1995 |
| JP | 8-194101 | 7/1996 |

* cited by examiner

Primary Examiner—Nathan M. Nutter
(74) Attorney, Agent, or Firm—Dinsmore & Shohl LLP

(57) ABSTRACT

A molded or formed product obtained by molding or forming a resin composition comprising (A) at least one vinyl cyclic hydrocarbon polymer selected from the group consisting of hydrogenated products of aromatic vinyl polymers, vinylcyclohexene polymers or hydrogenated products thereof, and vinylcyclohexane polymers, and (B) at least one substance selected from the group consisting of compounding additives incompatible with the polymer, organic compounds having at least one alcoholic hydroxyl group and at least one ether linkage, and organic compounds having at least one alcoholic hydroxyl group and at least one ester linkage, wherein the initial light transmittance (a) of the molded or formed product at an optional wavelength within a range of 400 to 800 nm and the light transmittance (b) of the molded or formed product after the molded or formed product is held for 1,000 hours in an atmosphere of 65° C. in temperature and 90% in relative humidity satisfy the relationship of the equation (1):

$$[(b)/(a)] \times 100 \geq 70 \quad (1)$$

and a resin composition.

20 Claims, No Drawings

RESIN COMPOSITION COMPRISING VINYL CYCLIC HYDROCARBON POLYMER AND A COMPOUND HAVING AN ALCOHOLIC HYDROXY GROUP AND AN ESTER LINKAGE

RELATED APPLICATION

This application is a divisional application of application Ser. No. 09/463,552 filed Jan. 26, 2000, now U.S. Pat. No. 6,365,660.

TECHNICAL FIELD

The present invention relates to resin compositions and molded or formed products (hereinafter typically referred to as molded products) comprising a vinyl cyclic hydrocarbon polymer, and more particularly to a resin composition excellent in transparency, heat resistance, low water absorption property, adhesion to metal films, and the like, small in birefringence, and moreover excellent in anti-opaque-whitening property under high-temperature and high-humidity environment, and molded products formed of such a resin composition. The resin compositions and molded products according to the present invention are particularly suitable for use as optical parts and medical molded products.

BACKGROUND ART

Vinyl cyclic hydrocarbon polymers such as hydrogenated products obtained by hydrogenating aromatic rings of aromatic vinyl polymers such as polystyrene, hydrogenated products of vinylcyclohexene polymers, and vinylcyclohexane polymers have heretofore been known to be resin materials suitable for use in fields of optical parts and the like of which transparency is required, because they are excellent in transparency, heat resistance, low water absorption property and the like and small in birefringence.

For example, Japanese Patent Application Laid-Open No. 43910/1988 discloses optical disk substrates formed of a noncrystalline thermoplastic resin comprising 80 to 100 wt. % of a vinylcyclohexane polymer containing at least 80 wt. % of a vinylcyclohexane component, and 0 to 20 wt. % of an aromatic vinyl polymer and having a light transmittance of at least 85%, a water absorptivity of at most 0.1 wt. % and birefringence of at most 50 nm. This publication discloses, as a process for preparing the vinylcyclohexane polymer, a process in which an aromatic vinyl polymer is hydrogenated, and a process in which vinylcyclohexane or a derivative thereof is polymerized. Japanese Patent Application Laid-Open No. 132603/1989 discloses optical materials comprising, as a component, a polymer obtained by hydrogenating at least 30% of aromatic hydrocarbon rings in a polymer obtained by (co)polymerizing a vinyl aromatic hydrocarbon compound or the vinyl compound and a monomer copolymerizable therewith.

However, products obtained by molding these vinyl cyclic hydrocarbon polymers have involved a problem that they undergo opaque-whitening under high-temperature and high-humidity environment. More specifically, when optical disk substrates, and optical parts such as plastic lenses formed of these vinyl cyclic hydrocarbon polymers are left to stand for a long period of time under the high-temperature and high-humidity environment, they undergo opaque-whitening, and their transparency is impaired. Since these optical parts are used or stored under various environments, the opaque-whitening under the high-temperature and high-humidity environment is an important problem leading to loss of their intrinsic functions. Medical molded products are often subjected to a steam sterilization treatment after molding, or before use. Medical molded products such as injector cylinders formed of these vinyl cyclic hydrocarbon polymers have involved a problem that they undergo opaque-whitening under high-temperature and high-humidity environment such as steam sterilization treatments, and so the contents cannot be checked upon filling of a medical fluid or use after that.

As a method for preventing opaque-whitening (environmental whitening) of molded products from a transparent thermoplastic resin, Japanese Patent Application Laid-Open No. 76657/1995 has proposed a method in which an incompatible compounding additive such as a rubbery polymer is dispersed in a thermoplastic resin so as to form microdomains having a particle diameter of at most 0.5 μm. In this publication, polycarbonate, polystyrene, polyethylene, polyester, polypropylene, poly(4-methylpentene-1), etc. are exemplified as the thermoplastic resin. Examples of this publication show that molded products, which undergo no opaque-whitening in a steam test that a sample is heated for 30 minutes with steam of 121° C., and a high-temperature and high-humidity environmental test that a sample is left to stand for 48 hours under environment of 85° C. in temperature and 90% in relative humidity (RH), can be provided from resin compositions with a styrene•ethylene•butadiene•styrene block copolymer finely dispersed in polycarbonate (Examples 1 and 2).

Japanese Patent Application Laid-Open No. 199950/1994 discloses molding materials comprising a vinyl cyclic hydrocarbon polymer low in low-molecular weight component content and residues of transition metal atoms. An Example of this publication shows that the use of a resin composition obtained by blending a small amount of a rubbery polymer into a hydrogenated product of polystyrene can provide injector cylinders that withstand a steam sterilization treatment at 121° C. for 30 minutes (Example 3).

According to the methods disclosed in these known papers, the opaque-whitening under the high-temperature and high-humidity environment can be prevented to some extent. However, it is not sufficient, and it has been extremely difficult to completely prevent opaque-whitening in, for example, such a high-temperature and high-humidity environmental test over a long period of time as required of precision optical parts, and such a repeated steam test as required of medical molded products.

When a thermoplastic resin material is used in optical disk substrates, it is required to have excellent adhesion to a recording film formed of a metal such as nickel (Ni) or aluminum (Al). However, resin materials comprising the conventional vinyl cyclic hydrocarbon polymer have been insufficient in adhesion to such a metallic recording film. More specifically, when a metallic recording film layer is formed on an optical disk substrate formed of such a resin material, and the substrate is then held for a long period of time under high-temperature and high-humidity environment, there has been caused a problem that interfacial separation between the substrate and the recording film occurs due to insufficient adhesion, which appears as blister.

DISCLOSURE OF THE INVENTION

It is an object of the present invention to provide a molded product which is formed of a resin composition comprising a vinyl cyclic hydrocarbon polymer as a main component, is excellent in transparency, heat resistance, low water absorption property, etc. and small in birefringence, and undergoes no opaque-whitening in a high-temperature and high-humidity test over a long period of time and a repeated steam test.

Another object of the present invention is to provide a molded product which is excellent in the above various properties and also adhesion to metal films such as metallic recording films and does not cause interfacial separation even in a high-temperature and high-humidity test over a long period of time.

A further object of the present invention is to provide a resin composition excellent in these various properties.

The present inventors have carries out an extensive investigation with a view toward overcoming the above-described problems involved in the prior art. As a result, it has been found that when molding conditions such as molding temperature and residence time of a resin composition, in which a compounding additive incompatible with a vinyl cyclic hydrocarbon polymer is blended into the polymer, in a molding machine are devised upon the formation of a molded product using the resin composition, a molded product which is excellent in various properties such as transparency, heat resistance, low water absorption property and birefringence, and undergoes no opaque-whitening even in a high-temperature and high-humidity test over a long period of time and a repeated steam test can be provided.

The present inventors have carried out a further investigation. As a result, it has been found that a resin composition obtained by blending an organic compound having at least one alcoholic hydroxyl group and at least one ether linkage, or an organic compound having at least one alcoholic hydroxyl group and at least one ester linkage into a vinyl cyclic hydrocarbon polymer can provide a molded product which is excellent in various properties such as transparency, heat resistance, low water absorption property and birefringence, and undergoes no opaque-whitening even in a high-temperature and high-humidity test over a long period of time and a repeated steam test, and is further excellent in adhesion to metal films. Namely, these alcoholic organic compounds act as an anti-opaque-whitening agent and has an action of improving the adhesion to the metal films. In addition, these resin compositions do not need to limit molding conditions to a narrow range and are liberal to the molding conditions and also excellent in molding and processing ability.

The present invention has been led to completion on the basis of these findings.

According to the present invention, there is thus provided a molded product obtained by molding a resin composition comprising (A) at least one vinyl cyclic hydrocarbon polymer selected from the group consisting of hydrogenated products of aromatic vinyl polymers, vinylcyclohexene polymers or hydrogenated products thereof, and vinylcyclohexane polymers, and (B) at least one substance selected from the group consisting of compounding additives incompatible with the polymer, organic compounds having at least one alcoholic hydroxyl group and at least one ether linkage, and organic compounds having at least one alcoholic hydroxyl group and at least one ester linkage, wherein the initial light transmittance (a) of the molded product at an optional wavelength within a range of 400 to 800 nm and the light transmittance (b) of the molded product after the molded product is held for 1,000 hours in an atmosphere of 65° C. in temperature and 90% in relative humidity satisfy the relationship of the equation (1):

$$[(b)/(a)] \times 100 \geq 70 \quad (1)$$

In the molded product according to the present invention, the initial light transmittance (a) of the molded product at an optional wavelength within a range of 400 to 800 nm and the light transmittance (c) of the molded product after the molded product is subjected to a process of holding the molded product for 20 minutes under steam environment of 121° C. and cooling it back to room temperature repeatedly twice can satisfy the relationship of the equation (2):

$$[(c)/(a)] \times 100 \geq 60 \quad (2)$$

According to the present invention, there is also provided a resin composition comprising (A) at least one vinyl cyclic hydrocarbon polymer selected from the group consisting of hydrogenated products of aromatic vinyl polymers, vinylcyclohexene polymers or hydrogenated products thereof, and vinylcyclohexane polymers, and (B1) an organic compound having at least one alcoholic hydroxyl group and at least one ether linkage.

According to the present invention, there is further provided a resin composition comprising (A) at least one vinyl cyclic hydrocarbon polymer selected from the group consisting of hydrogenated products of aromatic vinyl polymers, vinylcyclohexene polymers or hydrogenated products thereof, and vinylcyclohexane polymers, and (B2) an organic compound having at least one alcoholic hydroxyl group and at least one ester linkage.

The molded product according to the present invention is particularly suitable for use as an optical part or medical molded product.

BEST MODE FOR CARRYING OUT THE INVENTION

Vinyl Cyclic Hydrocarbon Polymer

The vinyl cyclic hydrocarbon polymer useful in the practice of the present invention is at least one polymer selected from the group consisting of (i) hydrogenated products of aromatic vinyl polymers, (ii) vinylcyclohexene polymers or hydrogenated products thereof, and (iii) vinylcyclohexane polymers.

Examples of a monomer used for obtaining the vinyl cyclic hydrocarbon polymer used in the present invention include aromatic vinyl compounds (styrene monomers) such as styrene, α-methylstyrene, α-ethylstyrene, α-propylstyrene, α-isopropylstyrene, α-tert-butylstyrene, 2-methylstyrene, 3-methylstyrene, 4-methylstyrene, 2,4-diisopropylstyrene, 2,4-dimethylstyrene, 4-tert-butylstyrene, 5-tert-butyl-2-methylstyrene, monochlorostyrene, dichlorostyrene, monofluorostyrene and 4-phenylstyrene; vinylcyclohexane monomers such as vinylcyclohexane and 3-methylisopropenylcyclohexane; vinylcyclohexene monomers such as 4-vinylcyclohexene, 4-isopropenylcyclohexene, 1-methyl-4-vinylcyclohexene, 1-methyl-4-isopropenyl-cyclohexene, 2-methyl-4-vinylcyclohexene and 2-methyl-4-isopropenylcyclohexene; and vinyl 6-membered ring hydrocarbon monomers such as terpene monomers such as d-terpene, 1-terpene and diterpene, or substituted products thereof.

In the present invention, another monomer than the above-mentioned monomers may be copolymerized so far as the repeating unit derived therefrom amounts to lower than 50 wt. % in the resulting copolymer. No particular limitation is imposed on the copolymerizable monomer so far as it is copolymerizable by a polymerization method such as radical polymerization, anionic polymerizatin or cationic polymerization, and specific examples thereof include α-olefin monomers such as ethylene, propylene, isobutene, 2-methyl-1-butene, 2-methyl-2-pentene and 4-methyl-1-pentene; cyclopentadiene monomers such as cyclopentadiene, 1-methylcyclopentadiene, 2-methylcyclopentadiene, 2-ethylcyclopentadiene, 5-methylcyclopentadiene and 5,5-dimethylcyclopentadiene; cycloolefin monomers such as cyclobutene, cyclopentene, cyclohexene and dicyclopentadiene; conjugated diene monomers such as butadiene, isoprene, 1,3-pentadiene, furan, thiophene and 1,2-cyclohexene; nitrile monomers such acrylonitrile, methacrylonitrile and α-chloroacrylonitrile; (meth)acrylic ester monomers such as methyl methacrylate, ethyl methacrylate, propyl methylacrylate, butyl methacrylate, methyl acrylate, ethyl acrylate, propyl acrylate and butyl acrylate; unsaturated fatty acid monomers such as acrylic acid, methacrylic acid and maleic anhydride; phenylmaleimide; cyclic ether monomers such as ethylene oxide, propylene oxide, trimethyl oxide, trioxane, dioxane, cyclohexene oxide, styrene oxide, epichlorohydrin and tetrahydrofuran; heterocyclic ring-containing vinyl compound monomers such as methyl vinyl ether, N-vinylcarbazole and N-vinyl-2-pyrrolidone.

When the content of the repeating units derived from these copolymerizable monomers increases, the resulting polymer generally tends to lower its transparency. Accordingly, the proportion of the repeating units derived from these copolymerizable monomers is generally lower than 50 wt. %, preferably lower than 30 wt. %, more preferably lower than 10 wt. % based on the whole repeating unit.

When a styrene monomer having an aromatic ring is used as the monomer, it is preferred that the resulting polymer be subjected to a hydrogenation reaction after polymerization in such a manner that the hydrogenation rate of aromatic rings is generally at least 80%, preferably at least 90%, more preferably at least 95% in order to make the birefringence of the polymer small. The hydrogenation rate is often 99 to 100%. When a vinylcyclohexene monomer is used as the monomer, it is also preferred that the resulting polymer be subjected to a hydrogenation reaction after polymerization to saturate carbon-carbon double bonds in order to improve the heat resistance and weather resistance of the polymer. In this case as well, the hydrogenation is preferably conducted in such a manner that the hydrogenation rate is generally at least 80%, preferably at least 90%, more preferably at least 95%, often 99 to 100%. Even when carbon-carbon unsaturated bonds derived from the copolymerizable monomer are present in the resulting copolymer, the unsaturated bonds are preferably saturated by a hydrogenation reaction. If the hydrogenation rate is extremely low, the birefringence of the resulting hydrogenated product becomes great, and the heat resistance and weather resistance of the polymer are deteriorated. It is hence not preferable to conduct the hydrogenation at such a low hydrogenation rate. The hydrogenation rate can be determined by a $^1$H-NMR measuring method in accordance with a method known per se in the art.

The vinyl cyclic hydrocarbon polymer used in the present invention desirably contains the repeating unit of the vinyl cyclic hydrocarbon in a proportion of generally at least 50 wt. %, preferably at least 70 wt. %, more preferably at least 90 wt. %. The upper limit of the proportion of the repeating unit of the vinyl cyclic hydrocarbon is 100 wt. %.

The weight average molecular weight (Mw) of the vinyl cyclic hydrocarbon polymer used in the present invention is within a range of generally 10,000 to 1,000,000, preferably 50,000 to 500,000, more preferably 100,000 to 300,000 in terms of polystyrene as measured by gel permeation chromatography (GPC). The molecular weight distribution of the polymer is expressed by a ratio (Mw/Mn) of the weight average molecular weight (Mw) to the number average molecular weight (Mn), both, in terms of polystyrene as measured by GPC and is at most 5.0, preferably at most 3.0, more preferably at most 2.5, most preferably at most 2.0.

If the weight average molecular weight (Mw) of the vinyl cyclic hydrocarbon polymer is too low, the strength properties of the resulting resin composition are lowered. If the weight average molecular weight (Mw) is too high, the molding ability of the resulting resin composition is lowered, and the birefringence thereof becomes insufficient. It is preferred that the weight average molecular weight (Mw) falls within the above range, since the mechanical strength, molding ability and birefringence of such a polymer are balanced with one another at a high level. When the Mw/Mn of the vinyl cyclic hydrocarbon polymer falls within the above range, the mechanical strength and heat resistance of the resulting molded product become far excellent. If the Mw/Mn is too high, the strength properties and glass transition temperature (Tg) of the polymer are lowered, and so it is difficult to provide a molded product excellent in mechanical strength and heat resistance.

If the weight average molecular weight (Mw) of an unhydrogenated polymer is extremely high when the vinyl cyclic hydrocarbon polymer used in the present invention is a hydrogenated product, it is difficult to conduct the hydrogenation reaction of aromatic rings at a high hydrogenation rate, and a molecular chain scissoring reaction, which is a competitive reaction, proceeds if the hydrogenation reaction is allowed to proceed until the hydrogenation rate reaches about 100%, so that the molecular weight distribution of the resulting hydrogenated product becomes wider, and the strength properties and heat resistance thereof are lowered because a low-molecular weight component increases. If the weight average molecular weight (Mw) of the unhydrogenated polymer is extremely low on the other hand, the strength properties of the polymer is lowered, and so it is difficult to provide a molded product having sufficient mechanical strength. Therefore, the weight average molecular weight (Mw) of the unhydrogenated polymer also preferably falls within the above range from the viewpoints of mechanical strength, heat resistance, etc. (Preparation process of vinyl cyclic hydrocarbon polymer)

The vinyl cyclic hydrocarbon polymer used in the present invention can be obtained by polymerizing one or more of such various kinds of monomers as described above using the publicly known polymerization method such as radical polymerization, anionic polymerization, anionic living polymerization, cationic polymerization or cationic living polymerization and optionally subjecting the resultant polymer to a hydrogenation reaction. When the radical polymerization method is adopted as a polymerization method, polymerization can be carried out in accordance with the publicly known process using an organic peroxide as a catalyst. When the cationic polymerization method is adopted, polymerization can be carried out in accordance with the publicly known process using $BF_3$, $PF_6$ or the like as a catalyst.

In order to obtain a polymer having a narrow molecular weight distribution, it is preferred that polymerization be carried out in accordance with the anionic living polymerization method. More specifically, monomer(s) are polymerized by using an organoalkali metal as an initiator in a hydrocarbon solvent, thereby easily obtaining a (co) polymer.

Examples of the organoalkali metal include monoorganolithium compounds such as n-butyllithium, sec-butyllithium, tert-butyllithium, hexyllithium, phenyllithium and stilbenelithium; polyfunctional organolithium compounds such as dilithiomethane, 1,4-dilithiobutane, 1,4-dilithio-2-ethylcyclohexane and 1,3,5-trilithiobenzene; sodium naphthalene; and potassium naphthalene. Of these, the organolithium compounds are preferred, with the monoorganolithium compounds being particularly preferred.

These organoalkali metals may be used either singly or in any combination thereof. The amount of the organoalkali metal used is suitably selected according to the molecular weight required of the polymer formed. It is generally within a range of 0.05 to 100 mmol, preferably 0.10 to 50 mmol, more preferably 0.15 to 20 mmol per 100 g of the monomer (s).

As a polymerization process, any of various polymerization processes such as bulk polymerization, emulsion polymerization, suspension polymerization and solution polymerization may be applied. However, the solution polymerization is preferred from the viewpoint of continuously conducting a hydrogenation reaction when the hydrogenation reaction is carried out after polymerization.

A hydrocarbon solvent is preferred as a solvent used in the solution polymerization. Specifically, no particular limitation is imposed on the hydrocarbon solvent so far as it does not destroy the above-described initiator. Examples thereof include aliphatic hydrocarbons such as n-butane, n-pentane, isopentane, n-hexane, n-heptane and isooctane; alicyclic hydrocarbons such as cyclopentane, cyclohexane, methylcyclopentane, methylcyclohexane and decalin; aromatic hydrocarbons such as benzene and toluene; and ethers such as tetrahydrofuran and dioxane. Of these, the use of an aliphatic hydrocarbon or alicyclic hydrocarbon is preferred because a hydrogenation reaction can be conducted as it is after the polymerization. These hydrocarbon solvents may be used either singly or in any combination thereof in an amount sufficient for the concentration of the monomer(s) to amount to generally 1 to 40 wt. %.

The polymerization reaction may be either an isothermal reaction or an adiabatic reaction, and is carried out in a polymerization temperature range of generally −70 to 150° C., preferably −50 to 120° C. The polymerization time is within a range of 0.01 to 20 hours, preferably 0.1 to 10 hours.

After the polymerization reaction, the polymer can be recovered by the publicly known method such as steam stripping, direct desolvating or alcoholic solidifying. The polymer may be fed to a hydrogenating step as it is without recovering the polymer from a polymer solution when a solvent inert to the hydrogenation reaction is used upon the polymerization.

No particular limitation is imposed on the hydrogenation process of the polymer, and the hydrogenation can be conducted in accordance with a method known per se in the art. However, a hydrogenation process, by which the hydrogenation rate of aromatic rings is high, and a polymer chain is scarcely scissored, is preferred. Specifically, for example, a hydrogenation catalyst containing at least one metal selected from among nickel, cobalt, iron, titanium, rhodium, palladium, platinum, ruthenium and rhenium can be used in an organic solvent to conduct a hydrogenation reaction. Among these hydrogenation catalysts, a nickel catalyst is preferred because a hydrogenated product having a particularly narrow molecular weight distribution (Mw/Mn) is provided. The hydrogenation catalyst may be either a heterogeneous catalyst or a homogeneous catalyst.

The heterogeneous catalyst may be used in the form of a metal or metal compound as it is, or by supporting it on a proper carrier. Examples of the carrier include active carbon, silica, alumina, calcium carbonate, titania, magnesia, zirconia, diatomaceous earth and silicon carbide. The amount of the hydrogenation catalyst supported on the carrier is within a range of generally 0.01 to 80 wt. %, preferably 0.05 to 60 wt. %.

As the homogeneous catalyst, there may be used a catalyst obtained by combining nickel, cobalt, titanium or iron compound with a organometallic compound (for example, organoaluminum or organolithium compound); or an organometallic complex of rhodium, palladium, platinum, ruthenium, rhenium or the like. Examples of the nickel, cobalt, titanium or iron compound used in the homogeneous catalyst include acetylacetone salts, naphthenates, cyclopentadienyl compounds and cyclopentadienyldichloro compounds of these various metals. As the organoaluminum, there may be suitably used an alkylaluminum such as triethylaluminum or triisobutylaluminum; an alkylaluminum halide such as diethylaluminum chloride or ethylaluminum dichloride; or an alkylaluminum hydride such as diisobutylaluminum hydride. As the organometallic complex, there may be used, for example, a γ-dichloro-π-benzene complex, dichloro-tris(triphenylphosphine) complex or hydrido-chloro-tris(triphenylphosphine) complex of any of the above-mentioned metals.

These hydrogenation catalyst may be used either singly or in any combination thereof. The amount of the hydrogenated catalyst used is within a range of generally 0.03 to 50 parts by weight, preferably 0.16 to 33 parts by weight, more preferably 0.33 to 15 parts by weight per 100 parts by weight of the aromatic vinyl polymer.

Examples of the organic solvent used in the hydrogenation reaction include alcohols in addition to the above-described solvents used in the polymerization reaction. These organic solvents may be used either singly or in any combination thereof. The amount of the organic solvent used is within a range sufficient for the concentration of the aromatic vinyl polymer to amount to generally 1 to 50 wt. %, preferably 3 to 40 wt. %.

The hydrogenation reaction is performed at a temperature within a range of generally 10 to 250° C., preferably 50 to 200° C., more preferably 80 to 180° C. under a hydrogen pressure within a range of generally 1 to 300 kg/cm$^2$, preferably 5 to 250 kg/cm$^2$, more preferably 10 to 200 kg/cm$^2$.

Incompatible Compounding Additive

No particular limitation is imposed on the incompatible compounding additive useful in the practice of the present invention so far as it is a substance (for example, a polymer or compound not mixed in the form of a molecule with the polymer, or the like) not completely dissolved in the above-described vinyl cyclic hydrocarbon polymer and is finely dispersed as an incompatible component in the polymer.

The incompatible compounding additive may be either an organic compound or an inorganic filler. In the case of the organic compound, organic high-molecular compounds and organic oligomers are preferred, not low-molecular weight compounding additives such as the general-purpose antioxidants, stabilizers, flame retardants and plasticizers.

When an organic compound is used as the incompatible compounding additive, microdomains are formed in the matrix of the vinyl cyclic hydrocarbon polymer in many cases. When the organic compound forms the microdomains, it is desirable that the organic compound should form microdomains having a particle diameter of at most 0.5 µm, preferably at most 0.3 µm, more preferably at most 0.2 µm and be finely dispersed.

When the resin composition used in the present invention contains the compounding additive incompatible with the polymer, it is considered that the reason why a molded product formed from the resin composition exhibits good anti-opaque-whitening property under high-temperature and high-humidity environment is that supersaturated water aggregates at an interface between the polymer and the finely dispersed compounding additive. Since the supersaturated water tends to aggregate at the interface between the polymer and the compounding additive when the supersaturated water aggregates in the resin composition, it is preferred that the total area of the interface in the resin composition be large, namely, the particle diameter of the compounding additive dispersed be made small. By making the particle diameter of the compounding additive small, it is possible to make the molded product formed of the resin composition transparent and improve its anti-opaque-whitening property. In addition, the degree of strain per unit area of the interface can be made little. The incompatible compounding additive may be either an inorganic filler or an organic compound. However, the organic compound is generally preferred because it has a buffering action against strain caused by the aggregation of water vapor.

Specific examples of the compounding additive incompatible with the vinyl cyclic hydrocarbon polymer will hereinafter be described with them classified in groups.

Examples of the inorganic filler include ultrafine powders of silica, alumina, glass and the like.

As the organic compound, is a high-molecular compound hard to form the cause of bleedout. As examples thereof, may be mentioned various kinds of high-molecular compounds such as polyether polymers such as poly(phenylene sulfide), poly(phenylene ether), poly(ether sulfone) and polysulfone; polyester polymers such as liquid crystal plastics, aromatic polyester, polyarylate, polyethylene terephthalate, polybutylene terephthalate, polycarbonate, poly(ether ether ketone) and poly(ether ketone); polyolefin polymers such as polyethylene, polypropylene, poly(4-methylpentene-1) and cycloolefin polymers; general-purpose transparent plastics such as polymethyl methacrylate, cyclohexyl methacrylate-methyl methacrylate copolymers and acrylonitrile-styrene copolymers (AS resins); alicyclic acrylic resins; MS resins; and rubbery polymers.

Of these, rubbery polymers (including elastomers) having a buffering action against strain caused by the aggregation of water vapor and a glass transition temperature of 40° C. or lower are preferred. When rubbery polymers obtained by block copolymerization, and the like have at least two glass transition temperatures, they may be used as the rubbery polymer having a glass transition temperature of 40° C. or lower so far as the lowest glass transition temperature thereof is 40° C. or lower.

As specific examples of the rubbery polymers, may be mentioned isoprene rubber and hydrogenated products thereof; chloroprene rubber and hydrogenated products thereof; saturated polyolefin rubbers such as ethylene•propylene copolymers, ethylene•α-olefin copolymers and propylene•α-olefin copolymers; diene polymers such as ethylene•propylene•diene terpolymers, α-olefin•diene copolymers, diene copolymers, isobutylene•isoprene copolymers and isobutylene•diene copolymers, halides thereof, and hydrogenated products of the diene polymers and halides thereof; acrylonitrile•butadiene copolymers and hydrogenated products thereof: fluorine-containing rubbers such as vinylidene fluoride•ethylene trifluoride copolymers, vinylidene fluoride•propylene hexafluoride copolymers, vinylidene fluoride•propylene hexafluoride•ethylene tetrafluoride terpolymers and propylene•ethylene tetrafluoride copolymers; special rubbers such as urethane rubber, silicone rubber, polyether rubber, acrylic rubber, chlorosulfonated polyethylene rubber, epichlorohydrin rubber, propylene oxide rubber and ethylene•acrylic rubber; norbornene rubbery polymers such as copolymers of a norbornene monomer and ethylene or an α-olefin, terpolymers of a norbornene monomer, ethylene and an α-olefin, ring-opening polymers of norbornene monomers and hydrogenated products of ring-opening polymers of norbornene monomers; random or block styrene•butadiene copolymers such as styrene•butadiene rubber obtained by emulsion polymerization or solution polymerization, and hydrogenated product thereof; random copolymers of an aromatic vinyl monomer and a conjugated diene, such as styrene•butadiene styrene rubber, styrene•isoprene•styrene rubber and styrene•ethylene•butadiene•styrene rubber, and hydrogenated products thereof; thermoplastic styrene elastomers such as linear or radial black copolymers of an aromatic vinyl monomer and a conjugated diene monomer, such as styrene•butadiene•styrene rubber, styrene•isoprene•styrene rubber and styrene•ethylene•butadiene styrene rubber, and hydrogenated products thereof; and other thermoplastic elastomers such as thermoplastic urethane elastomers, thermoplastic polyamide elastomers, thermoplastic 1,2-polybutadiene elastomers, thermoplastic vinyl chloride elastomers and fluorine-containing thermoplastic elastomers.

When a hydrogenated product of an aromatic vinyl polymer is used as the vinyl cyclic hydrocarbon polymer, the copolymers of an aromatic vinyl monomer and a conjugated diene monomer and the hydrogenated products thereof are particularly preferred as the rubbery polymers because they are good in dispersibility in the vinyl cyclic hydrocarbon polymer so far as they are incompatible with the polymer. The copolymers of an aromatic vinyl monomer and a conjugated diene monomer may be either black copolymers or random copolymers. The copolymers are more preferably hydrogenated at their unsaturated portions other than the aromatic rings from the viewpoint of weather resistance. Specific examples thereof include styrene•butadiene block copolymers, styrene•butadiene•styrene block copolymers, styrene•isoprene block copolymers, styrene•isoprene•styrene block copolymers and hydrogenated products thereof, and styrene•butadiene random copolymers and hydrogenated products thereof.

When high transparency is required of the resin compositions according to the present invention, it is preferred that a difference in refractive index between the compounding additive and the vinyl cyclic hydrocarbon polymer be small. The difference in refractive index between both components is preferably at most 0.2, more preferably at most 0.1, particularly preferably at most 0.05. When particularly high transparency is required, the difference in refractive index is controlled to generally at most 0.02, preferably at most 0.015, more preferably at most 0.01. When a compounding additive great in the difference in refractive index from the polymer is mixed, the transparency of the resulting resin composition tends to be impaired if the compounding additive is added in a great amount. For example, the refractive index of the hydrogenated product of the aromatic vinyl polymer varies according to the kind thereof, while the refractive index of the rubbery polymer can be successively changed by changing a ratio between the monomers or changing the number of unsaturated bonds in a main chain. Accordingly, the refractive index of the rubbery polymer to be blended is adjusted according to the refractive index of the hydrogenated product of the aromatic vinyl polymer, whereby good transparency can be ensured. Namely, a rubbery polymer having a suitable refractive index can be selected according to the refractive index of the vinyl cyclic hydrocarbon polymer.

The incompatible compounding additive (hereinafter may be referred to as the compounding additive merely) is blended in a proper amount into the vinyl cyclic hydrocarbon polymer and dispersed in the polymer so as to form microdomains. The preferable amount of the compounding additive blended varies according to the combination of the vinyl cyclic hydrocarbon polymer with the compounding additive. If the amount of the rubbery polymer blended is too great, the glass transition temperature of the resulting resin composition is generally lowered, and the rubbery polymer forms no microdomain or aggregates. If the blending amount is too little, a distance between the microdomains is too long, and so water cannot be aggregated at the interface between the microdomains, and hence is aggregated at other portions than that. Therefore, the resulting molded product may undergo opaque-whitening under high-temperature and high-humidity environment in some cases. When for example, a rubbery polymer is used as the compounding additive, the rubbery polymer is added in a proportion of generally 0.01 to 15 parts by weight, preferably 0.02 to 10 parts by weight, more preferably 0.05 to 5 parts by weight, particularly preferably 0.1 to 2 parts by weight per 100 parts by weight of the vinyl cyclic hydrocarbon polymer. With respect to the other compounding additives, the blending amount thereof may also be suitably determined in view of the balance between transparency and anti-opaque-whitening property, mechanical strength, heat resistance, etc. However, the amount is preferably within the same range as described above for the same reasons as described above.

No particular limitation is imposed on the blending method so far as it is a method by which the compounding additive is sufficiently finely dispersed in the vinyl cyclic hydrocarbon polymer to form microdomains in the polymer. Examples thereof include a method in which the vinyl cyclic hydrocarbon polymer is melted in a mixer, single-screw kneader, twin-screw kneader or the like, and the compounding additive is added in such a state to knead the mixture, and a method in which the vinyl cyclic hydrocarbon polymer is dissolved in a proper solvent, the compounding additive is dispersed in the solution, and the solvent is then removed by a solidifying, casting or direct drying method.

When the vinyl cyclic hydrocarbon polymer and the compounding additive are melt kneaded, it is preferred that the mixture be kneaded at a resin temperature of generally (Tg+20° C.) to (Tg+150° C.), wherein Tg means a glass transition temperature of the polymer, while sufficiently applying shearing force to the mixture. If the resin temperature upon kneading is too low, the viscosity of the resin becomes high, and so it is difficult to knead the mixture. If the temperature is too high, the vinyl cyclic hydrocarbon polymer and the rubbery polymer are deteriorated, and both components cannot be satisfactorily kneaded due to differences in viscosity and melting point between both components.

For example, when a Laboplast mill (manufacture by Toyo Seiki Seisaku-sho, Ltd.) is used, the kneading is conducted by controlling a feed rate at a revolution speed of 20 to 70 rpm in accordance with a different-direction rotating, twin-screw mixer mode so as to give residence time of about 1 to 20 minutes, whereby the compounding additive such as the rubbery polymer can be dispersed in the vinyl cyclic hydrocarbon polymer such as the hydrogenated product of the aromatic vinyl polymer so as to form microdomains having a particle diameter of at most 0.5 $\mu$m. In a twin-screw kneader, L/D and residence time are generally controlled to at least 25, preferably at least 30, and about 1 to 20 minutes, respectively. The microdomains are easier to be formed as the residence time is longer. However, the vinyl cyclic hydrocarbon polymer and the rubbery polymer become easy to deteriorate. Therefore, it is desirable that the revolution speed, residence time, etc. fit for the combination of a polymer component and a compounding additive component to be used be determined by preliminarily conducting kneading by varying the combination thereof and a combination of their components and a device used in kneading.

When the rubbery polymer is used as a compounding additive, the microdomains become a substantial sphere, and a scatter in particle diameter among the particles is narrow. The size of the microdomains is generally at most 0.5 $\mu$m, preferably at most 0.3 $\mu$m, particularly preferably at most 0.2 $\mu$m in diameter. When the particle diameter of the microdomains is 0.3 $\mu$m or smaller, the degree of lowering of transparency of the vinyl cyclic hydrocarbon polymer by the addition of the rubbery polymer is such little that the resulting resin composition is practicable without problems. In the case of other compounding additives as well, it is preferred that the microdomains should become a substantial sphere, a scatter among the particles be little, and the particle diameter be generally at most 0.5 $\mu$m, preferably at most 0.3 $\mu$m, particularly preferably at most 0.2 $\mu$m. Even when the microdomains do not become a sphere, the diameter of a smallest sphere in which such a microdomain can be enclosed is controlled to generally at most 0.5 $\mu$m, preferably at most 0.3 $\mu$m, particularly preferably at most 0.2 $\mu$m.

Alcoholic Organic Compound Having an Ether Linkage

The organic compound having at least one alcoholic hydroxyl group and at least one ether linkage, which is useful in the practice of the present invention, is an alcoholic organic compound (partially etherified compound) having at least one alcoholic hydroxyl group, not a phenolic hydroxyl group, and at least one ether linkage unit in its molecule. In this organic compound, a phenolic hydroxyl group may be additionally present. No particular limitation is imposed on the alcoholic organic compound used in the present invention so far as it is such a partially etherified compound. However, preferred is such a compound that another portion than the alcoholic hydroxyl group is hydrophobic, and the hydrophobic portion is partially compatible with the vinyl cyclic hydrocarbon polymer, in order to prevent the transparency of the polymer from being lowered when the organic compound is blended with the polymer.

Such an alcoholic organic compound is preferably a partially etherified product of a dihydric or still higher polyhydric alcohol, for example, polyethylene glycol, glycerol, pentaerythritol, dipentaerythritol, sorbitol, tris(2-hydroxyethyl) isocyanurate, or the like, with a partially etherified product of a trihydric or still higher polyhydric alcohol being particularly preferred because effects of preventing opaque-whitening and improving adhesion to recording films are brought about by its addition in a small amount.

The partially etherified product of the polyhydric alcohol is particularly preferably a partially etherified product of a polyhydric alcohol having at least 3, preferably 3 to 8 hydroxyl groups.

As specific examples of the trihydric or still higher polyhydric alcohol, may be mentioned glycerol, trimethylolpropane, pentaerythritol, diglycerol, triglycerol, dipentaerythritol, 1,6,7-trihydroxy-2,2-di(hydroxymethyl)-4-oxoheptane, sorbitol, 2-methyl-1,6,7-trihydroxy-2-hydroxymethyl-4-oxoheptane and 1,5,6-trihydroxy-3-oxohexane.

In the present invention, a partially etherified compound obtained by etherifying a part of the alcoholic hydroxyl groups in a polyhydric alcohol is preferably used. This partially etherified compound has a molecular weight of generally 100 to 2,000, preferably 150 to 1,500, more preferably 200 to 1,000 in order to prevent the occurrence of bleeding upon molding of the resulting resin composition. Although preference varies according to the kind of a substituent introduced by the etherification, the molecular weight of the partially etherified compound is preferably 200 to 800, more preferably 250 to 650 when the substituent is an alkyl, alkylene, aryl or arylene group. The partially etherified compound is such that it has, in its molecule, at least one, preferably 2 to 16, more preferably 2 to 10 free hydroxyl groups which have not been etherified, and the alcoholic hydroxyl groups in the polyhydric alcohol have been etherified in a proportion of 10 to 50%, preferably 12 to 35%.

Although the substituent group used in the etherification is not always limited, it is a substituent having generally 4 to 100, preferably 4 to 30, more preferably 8 to 22 carbon atoms. As specific preferable examples of the substituent used in the etherification, may be mentioned linear or branched alkyl and alkylene groups having 4 to 30 carbon atoms, and aryl and arylene groups having 6 to 30 carbon atoms. If the number of carbon atoms in the substituent is too small, the resulting etherified compound tends to volatilize, resulting in a molded product easy to cause bleeding. If the number of carbon atoms in the substituent is too great, the compatibility of the resulting etherified compound with the vinyl cyclic hydrocarbon polymer may be lowered in some cases.

Examples of the alkyl groups include butyl, isobutyl, tert-butyl, pentyl, 2-methylbutyl, 2,2-dimethylpropyl, hexyl, cyclohexyl, benzyl, octyl, 2-ethylhexyl, nonyl, decyl, cetyl, lauryl, myristyl, palmityl, stearyl, arachidyl, behenyl and oleyl groups.

Examples of the alkylene groups include butylene, octylethylene, 1,4-cyclohexylene, octamethylene and decamethylene groups.

Examples of the aryl groups include phenyl, 2-methylphenyl, 4-methylphenyl, 4-octylphenyl, 4-nonylphenyl, 4-cumylphenyl, naphthyl and 4-phenylphenyl groups. Examples of the arylene groups include 1,4-phenylene, 4,4'-biphenylene, 1,4-phenyleneisopropylidene-1,4-phenylene, 1,4-phenyleneoxy-1,4-phenylene and 1,4-(2'-tert-butyl-5'-methyl)phenylenebutylidene-1,4-(2'-methyl-5'-tert-butyl)phenylene groups.

A method for etherifying a part of the alcoholic hydroxyl groups in the polyhydric alcohol with these substituents is well known, and is not particularly limited to a particular method.

Upon the etherification, may be used a condensation product of a phenol with an aldehyde and/or a ketone, a hydrogenated product of the condensation product, a condensation product of a phenol with an unsaturated hydrocarbon such as a diolefin according to a Friedel-Crafts reaction, a hydrogenated product of the condensation product, or a mixture of two or more of these compounds. In these compounds, a novolak type condensation residue having generally 13 to 100, preferably 15 to 75, more preferably 13 to 30 carbon atoms, or a hydrogenated product thereof is used as a substituent in the etherification. Of these, condensation products (including hydrogenated products) having a condensation degree of at most 4 are preferred. If the condensation degree is too great, the compatibility of the resulting partially etherified compound with the vinyl cyclic hydrocarbon polymer is deteriorated. A preferred condensation degree is 1.5 to 4.0 in terms of the average value of the molecules in the condensation product. In this case, the molecular weight of the etherified compound amount to preferably 280 to 2,000, more preferably 350 to 1,500.

Examples of the phenol include phenol, butylphenyl, octylphenol, nonylphenol and cresol. Examples of the aldehyde include formaldehyde, acetoaldehyde, propionaldehyde and butylaldehyde. Examples of the ketone include acetone, methyl ethyl ketone, methyl isobutyl ketone, cyclohexanone and acetophenone. Examples of the diolefin include butadiene, isoprene, 1,3-pentadiene and dicyclopentadiene.

Examples of the condensation product of the phenol and the aldehyde and/or the ketone include condensation products of p-nonylphenol with formaldehyde, condensation products of p-octylphenol with formaldehyde, and condensation products of p-octylphenol with formaldehyde. Examples of the condensation product of the phenol and the diolefin include condensation products of p-octylphenol with dicyclopentadiene. The etherification with such a condensation product can be not only prepared by actual condensation, but also obtained by hydrolysis of a cresol•novolak type epoxy resin.

For example, when glycerol or polyglycerol is used as the trihydric or still higher polyhydric alcohol, the typical partially etherified product of the polyhydric alcohol according to the present invention can be represented by the following general formula:

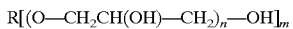

wherein

R: a linear or branched alkyl or alkylene group having 4 to 30 carbon atoms, aryl group, arylene group, novolak type condensate residue, or hydrogenated product of the novolak type condensate residue, and n and m: independently a natural number of 1 or greater.

In the case of the partially etherified product of glycerol or polyglycerol which is a single component, n in the general formula is generally 1 to 4, preferably 1 to 3, while m is generally 1 to 6, preferably 1 to 4.

The partially etherified product of glycerol or polyglycerol is generally obtained as a mixture, and may be used as it is without isolating and purifying the individual components. In that case, n is generally 1.0 to 4.0, preferably 1.0 to 3.0, and m is generally 1.0 to 6.0, preferably 1.5 to 4.0, both, in terms of the average value of the whole partially etherified compound. If n or m is too great, the resulting etherified compound shows a tendency to lower the compatibility with the vinyl cyclic hydrocarbon polymer.

Such a partially etherified product of glycerol or polyglycerol can be synthesized by, for example, a method in which a monohydric to tetrahydric alcohol or monohydric to tetrahydric phenol is reacted with glycidol, or a method in which an epoxy compound is reacted with glycerol or polyglycerol.

Specific examples thereof include 3-(octyloxy)-1,2-propanediol, 3-(decyloxy)-1,2-propanediol, 3-(lauryloxy)1,2-propanediol, 3-(myristyloxy)-1,2-propanediol, 3-(palmityloxy)-1,2-propanediol, 3-(stearyloxy)-1,2propanediol, 3-(arachidyloxy)-1,2-propanediol, 3-(behenyloxy)-1,2-propanediol, 3-(oleyloxy)-1,2-propanediol, 3-(2-ethylhexyloxy)-1,2-propanediol, 3-(2-hexyldecyloxy)1,2-propanediol, 3-phenoxy-1,2-propanediol, 3-(4-methylphenyloxy)-1,2-propanediol, 3-(4-isopropyloxy)-1,2-propanediol, 3-(4-octylphenyloxy)-1,2-propanediol, 3-(4-nonylphenyloxy)-1,2-propanediol, 3-[4-[1-methyl-1-(4-hydroxyphenyl)ethyl]] phenyloxy)-1,2-propanediol, 1,6-di(2,3-dihydroxypropyloxy)hexane, 1,4-di(2,3-dihydroxypropyloxy)cyclohexane, 1,4-di(2,3-dihydroxypropyloxy)-benzene, 2,2-bis[4-(2,3-dihydroxypropyloxy)phenyl]propane, 1-(4-nonylphenyl)-2,6,7-trihydroxy-4-oxoheptane, poly(oxy-2-hydroxytrimethylene)phenyl ether, poly(oxy-2-hydroxytrimethylene)octylphenyl ether, poly(oxy-2-hydroxytrimethylene)nonylphenyl ether, poly(oxy-2-hydroxytrimethylene)lauryl ether, poly(oxy-2-hydroxytrimethylene)-cetyl ether, poly(oxy-2-hydroxytrimethylene)stearyl ether, ether compounds obtained by a reaction of a condensate of p-nonylphenol with formaldehyde with glycidol, ether compounds obtained by a reaction of a condensate of p-octylphenol with formaldehyde with glycidol and ether compounds obtained by a reaction of a condensate of p-octylphenol with dicyclopentadiene with glycidol.

Examples of partially etherified products of other trihydric or still higher polyhydric alcohols include 1,6-dihydroxy-2,2-di(hydroxymethyl)-7-(4-nonylphenyloxy)-4-oxoheptane, 1,6-dihydroxy-2-methyl-2-hydroxymethyl-7-(4-nonylphenyloxy)-4-oxoheptane, 2-hydroxymethyl-2-(4-nonylphenyloxy)methyl-1,3-propanediol, 2-methyl-2-(4-nonylphenyloxy)methyl-1,3-propanediol and 2,2,6-tri(hydroxy-methyl)-6-(4-nonylphenyloxy)methyl-1,7-dihydroxy-4-oxyheptane.

These partially etherified compounds may be used either singly or in any combination thereof. The blending proportion thereof is generally 0.01 to 10 parts by weight, preferably 0.05 to 5 parts by weight, more preferably 0.1 to 3 parts by weight per 100 parts by weight of the vinyl cyclic hydrocarbon polymer. It the blending proportion is too low, the effects of preventing opaque-whitening under high-temperature and high-humidity environment and improving adhesion to recording films (metal films) are not sufficiently achieved. On the other hand, any blending proportion too high results in a resin composition markedly lowered in heat distortion temperature and deteriorated in mechanical strength. It is hence not preferable to blend the partially etherified compound in both too low and too high proportions.

Therefore, the blending amount within the above range is preferred because the effects of preventing opaque-whitening and improving adhesion are balanced with properties such as mechanical strength and heat resistance at a high level.

These partially etherified compounds may be blended in accordance with, for example, a method in which it is mixed with the polymer, and the mixture is then melted and kneaded in a twin-screw extruder or the like, or in which it is added to and dissolved in a solution of the polymer, and the solvent is then distilled off. When the partially etherified compound and the vinyl cyclic hydrocarbon polymer are melt kneaded, it is preferred that the mixture be kneaded at a resin temperature of generally (Tg+20° C.) to (Tg+150° C.), wherein Tg means a glass transition temperature of the polymer, while sufficiently applying shearing force to the mixture. If the resin temperature upon kneading is too low, the viscosity of the resin becomes high, and so it is difficult to knead the mixture. If the temperature is too high, the vinyl cyclic hydrocarbon polymer and the partially etherified compound are deteriorated, and both components cannot be satisfactorily kneaded due to differences in viscosity and melting point between both components. When the solution of the polymer is used, the solvent can be removed by a solidifying, casting or direct drying method after the addition of the partially etherified compound. (Alcoholic organic compound having an ester linkage)

The organic compound having at least one alcoholic hydroxyl group and at least one ester linkage, which is useful in the practice of the present invention, is an alcoholic organic compound (partially esterified compound) having at least one alcoholic hydroxyl group, not a phenolic hydroxyl group, and at least one ester linkage unit in its molecule. In this organic compound, a phenolic hydroxyl group may be additionally present. No particular limitation is imposed on the alcoholic organic compound so far as it is such a partially esterified compound. However, preferred is such a compound that at least one of hydroxyl groups in a dihydric or still higher polyhydric alcohol such as polyethylene glycol, sorbitol or tris(2-hydroxyethyl) isocyanurate, or preferably a trihydric or still higher polyhydric alcohol such as pentaerythritol or dipentaerythritol has been esterified. Among others, a partially esterified product of a trihydric or still higher polyhydric alcohol is particularly preferred because effects of preventing opaque-whitening and improving adhesion to recording films are brought about by its addition in a small amount. Besides, polyhydric alcohols such as glycerol, diglycerol and triglycerol, from which a partially esterified compound containing an α,β-diol moiety can be synthesized, are preferred.

The partially esterified product of the polyhydric alcohol is particularly preferably a partially esterified product of a polyhydric alcohol having at least 3, preferably 3 to 8 hydroxyl groups.

As specific examples of the trihydric or still higher polyhydric alcohol, may be mentioned glycerol, trimethylolpropane, pentaerythritol, diglycerol, triglycerol, dipentaerythritol, 1,6,7-trihydroxy-2,2-di(hydroxymethyl)-4-oxoheptane, sorbitol, 2-methyl-1,6,7-trihydroxy-2-hydroxymethyl-4-oxoheptane and 1,5,6-trihydroxy-3-oxohexane.

In the present invention, a partially esterified compound obtained by esterifying a part of the alcoholic hydroxyl groups in such a polyhydric alcohol as described above is preferably used. A partially esterified compound having at least one α,β-diol moiety is more preferred. This partially esterified compound has a molecular weight of generally 100 to 2,000, preferably 150 to 1,500, more preferably 200 to 1,000. If the molecular weight of the partially esterified compound is too low, such an esterified compound has high volatility, resulting in a molded product causing bleeding. If the molecular weight is too high, the compatibility of such an esterified compound with the vinyl cyclic hydrocarbon polymer is deteriorated, so that a molded product from the resulting resin composition comes to undergo opaque-whitening. Therefore, any molecular weight of the partially esterified compound within the above range is preferred because the bleed resistance and compatibility of the organic compound are balanced with each other at a high level. The partially esterified compound is such that it has, in its molecule, at least one, preferably 2 to 16, more preferably 2 to 10 free alcoholic hydroxyl groups which have not been ester-substituted, and the alcoholic hydroxyl groups in the polyhydric alcohol have been ester-substituted in a proportion of 10 to 50%, preferably 12 to 35%.

Although the substituent group used in the esterification is not always limited, it is a substituent having generally 4 to 100, preferably 8 to 30, more preferably 12 to 22 carbon atoms. As specific preferable examples of such a substituent, may be mentioned linear or branched alkyl and alkylene groups having 4 to 30 carbon atoms, and aryl and arylene groups having 6 to 30 carbon atoms. If the number of carbon atoms in the substituent is too small, the resulting esterified compound tends to volatilize, resulting in a molded product easy to cause bleeding. If the number of carbon atoms in the substituent is too great, the compatibility of the resulting esterified compound with the vinyl cyclic hydrocarbon polymer may be lowered in some cases.

Examples of the alkyl groups include butyl, isobutyl, tert-butyl, pentyl, 2-methylbutyl, 2,2-dimethylpropyl, hexyl, cyclohexyl, benzyl, octyl, 2-ethylhexyl, nonyl and decyl groups, and preferable examples thereof include lauryl, arachidyl and behenyl groups.

Examples of the alkylene groups include butylene, octylethylene, 1,4-cyclohexylene, octamethylene and decamethylene groups, and preferable examples thereof include laurylmethylene and cetylmethylene groups.

Examples of the aryl groups include phenyl, 2-methylphenyl, 4-methylphenyl, 4-phenylphenyl and naphthyl groups, and preferable examples thereof include 4-octylphenyl, 4-nonylphenyl and 4-cumylphenyl groups.

Examples of the arylene groups include 1,4-phenylene and 4,4'-biphenylene groups, and preferable examples thereof include 1,4-phenylene-isopropylidene-1,4-phenylene, 1,4-phenyleneoxy-1,4-phenylene and 1,4-(2'-tert-butyl-5'-methyl)phenylene-butylidene-1,4-(2'-methyl-5'-tert-butyl)phenylene groups.

The reason why the substituents exemplified as being preferable groups are preferred is that partially esterified compounds obtained therefrom are hard to volatilize, and molded products obtained from their resin compositions with the vinyl cyclic hydrocarbon polymer are excellent in transparency.

As the partially esterified product of the polyhydric alcohol, is preferred a compound obtained by esterifying a part of the alcoholic hydroxyl groups in any of the above-mentioned polyhydric alcohols. Therefore, as specific examples of the partially esterified product of the polyhydric alcohol used, may be mentioned glycerol fatty acid esters such as glycerol monostearate, glycerol monolaurate, glycerol monomyristate, glycerol monopalmitate, glycerol monooleate, glycerol distearate, glycerol dilaurate and glycerol dioleate; and pentaerythritol fatty acid esters such as pentaerythritol fatty acid esters such as pentaerythritol monostearate, pentaerythritol monolaurate, pentaerythritol distearate, pentaerythritol dilaurate and pentaerythritol tristearate.

In the case of the esterified compound as well, a partially esterified compound making use of glycerol or polyglycerol as the trihydric or still higher polyhydric alcohol is preferred. The typical partially esterified compounds thereof can be represented by the following general formula:

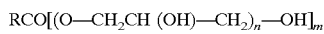

wherein
R: a linear or branched alkyl or alkylene group having 4 to 30 carbon atoms, aryl group, arylene group, novolak type condensate residue, or hydrogenated product of the novolak type condensate residue, and n and m: independently a natural number of 1 or greater.

In the case of the partially esterified compound of glycerol or polyglycerol which is a single component, n in the general formula is generally 1 to 4, preferably 1 to 3, while m is generally 1 to 6, preferably 1 to 4. As the novolak type condensate residue and the hydrogenated product of the novolak type condensate residue, may be mentioned those described above.

The partially esterified product of glycerol or polyglycerol is generally obtained as a mixture, and may be used as it is without isolating and purifying the individual components. In that case, n is generally 1.0 to 4.0, preferably 1.0 to 3.0, and m is generally 1.0 to 6.0, preferably 1.5 to 4.0, both, in terms of the average value of the whole partially esterified compound. If n or m is too great, the resulting esterified compound may be lowered in compatibility with the vinyl cyclic hydrocarbon polymer in some cases.

Since the effects of preventing opaque-whitening and improving adhesion are markedly improved when these partially esterified compounds contain an α,β-diol moiety, partially esterified products of polyhydric alcohols such as glycerol, diglycerol and triglycerol, from which a partially esterified compound containing an α,β-diol moiety can be synthesized, are more preferred.

These partially esterified compounds may be used either singly or in any combination thereof.

These partially esterified compounds are used either singly or in any combination thereof. The blending proportion thereof is generally 0.01 to 10 parts by weight, preferably 0.05 to 5 parts by weight, more preferably 0.1 to 3 parts by weight per 100 parts by weight of the vinyl cyclic hydrocarbon polymer. It the blending proportion is too low, the effects of preventing opaque-whitening under high-temperature and high-humidity environment and improving adhesion to recording films (metal films) are not sufficiently achieved. On the other hand, any blending proportion too high results in a resin composition markedly lowered in heat distortion temperature and deteriorated in mechanical strength. It is hence not preferable to blend the partially esterified compound in both too low and too high proportions.

Therefore, the blending amount within the above range is preferred because the effects of preventing opaque-whitening and improving adhesion are balanced with properties such as mechanical strength and heat resistance at a high level.

These partially esterified compounds may be blended in accordance with, for example, a method in which it is mixed with the polymer, and the mixture is then melted and kneaded in a twin-screw extruder or the like, or in which it is added to and dissolved in a solution of the polymer, and the solvent is then distilled off. When the partially esterified compound and the vinyl cyclic hydrocarbon polymer are melt kneaded, it is preferred that the mixture be kneaded at a resin temperature of generally (Tg+20° C.) to (Tg+150° C.), wherein Tg means a glass transition temperature of the polymer, while sufficiently applying shearing force to the mixture. If the resin temperature upon kneading is too low, the viscosity of the resin becomes high, and so it is difficult to knead the mixture. If the temperature is too high, the vinyl cyclic hydrocarbon polymer and the partially esterified compound are deteriorated, and both components cannot be satisfactorily kneaded due to differences in viscosity and melting point between both components. When the solution of the polymer is used, the solvent can be removed by a solidifying, casting or direct drying method after the addition of the partially etherified compound.

Other Additives

The vinyl cyclic hydrocarbon polymers according to the present invention may be get to have a filtering function by uniformly dispersing and blending an absorbent and/or a colorant such as a dye or pigment, which absorbs only rays in a specific wavelength region.

No particular limitation is imposed on the absorbent and colorant. However, examples thereof include near infrared absorbents which selectively absorb rays in an optional wavelength region in a near infrared wavelength region of 600 to 2,500 nm; and colorants such as dyes and pigments, which selectively absorb rays in a visible wavelength region of 600 nm or shorter.

Specific examples of the near infrared absorbents include cyanine type near infrared absorbents, pyrylium type near infrared absorbents, squalilium type near infrared absorbents, croconium type near infrared absorbents, azulenium type near infrared absorbents, phthalocyanine type near infrared absorbents, dithiol metal complex type near infrared absorbents, naphthoquinone type near infrared absorbents, anthraquinone type near infrared absorbents, indophenol type near infrared absorbents, and azi type near infrared absorbents.

As examples of commercially available near infrared absorbents, may be mentioned SIR-103, SIR-114, SIR-128, SIR-130, SIR-132, SIR-152, SIR-159 and SIR-162 (all, products of Mitsui Toatsu Dye Co., Ltd.), and Kayasorb IR-750, Kayasorb IRG-002, Kayasorb IRG-003, IR-820B, Kayasorb IRG-022, Kayasorb IRG-023, Kayasorb CY-2, Kayasorb cCY-4 and Kayasorb CY-9 (all, products of Nippon Kayaku Co., Ltd.).

As the colorants, may be mentioned organic colorants and inorganic colorants. However, the organic colorants are preferred from the viewpoint of uniformly dispersing ability. As the organic colorants, there may be used organic pigments and dyes. The dyes are preferably insoluble in water.

No particular limitation is imposed on the organic colorants, and organic pigments and dyes generally blended into transparent resins may be used. As preferable examples of the organic colorants, may be mentioned diarylide pigments such as Pigment Red 38; azo lake pigments such as Pigment Red 48:2, Pigment Red 53 and Pigment Red 57:1; condensed azo pigments such as Pigment Red 144, Pigment Red 166, Pigment Red 220, Pigment Red 221 and Pigment Red 248; benzimidazolone pigments such as Pigment Red 171, Pigment Red 175, Pigment Red 176, Pigment Red 185 and Pigment Red 208; quinacridone pigments such as Pigment Red 122; perylene pigments such as Pigment Red 149, Pigment Red 178 and Pigment Red 179; anthraquinone pigments such as Pigment Red 177; and anthraquinone color dyes.

These absorbents and colorants may be used either singly or in any combination thereof, and suitably selected as necessary for the end application intended.

Into the resin compositions according to the present invention, may be blended various kinds of additives as needed. No particular limitation is imposed on the additives so far as they are generally used in molding materials. Examples thereof include antioxidants such as the phenol, phosphate and thiol types; ultraviolet absorbents such as the hindered phenol type; parting agents such as aliphatic alcohols, aliphatic esters, aromatic esters, triglycerides, fluorine-containing surfactants and higher fatty acid metal salts; lubricants; plasticizers; antistatic agents; and heavy metal deactivators.

These additives may be used either singly or in any combination thereof. The amount of the additives used is suitably selected within limits not impeding the objects of the present invention.

Molding Process of Molded Product

The molded products according to the present invention mean molded or formed products obtained by molding or forming a resin composition obtained by blending such particular compounding additive and/or organic compound as described above into a vinyl cyclic hydrocarbon polymer by means of, for example, an injection molding, compression molding, extrusion, injection blow molding, blow molding or cast molding process into an optional form.

When the resin composition comprising the vinyl cyclic hydrocarbon polymer and the compounding additive incompatible with the polymer among the above-described resin compositions is particularly used, molding conditions must be suitably selected. Therefore, the molding conditions in the case where such a resin composition is used will hereinafter be described in detail.

In order to molding the resin composition comprising the vinyl cyclic hydrocarbon polymer and the compounding additive incompatible with the polymer, it is necessary to select such molding conditions that microdomains of the incompatible compounding additive undergo no aggregation, and the particle diameter and distribution of particles finely dispersed therein are held without substantial changes.

When this kind of resin material has heretofore been used to mold it into a molded product, the resin material has been heated and melted at a comparatively high resin temperature, filled into a mold and cooled over a sufficiently long period of time to give preference to improvement in birefringence and profile irregularities in the case where an optical part is molded in particular, and to reduction in residual stress (if high, the chemical resistance is deteriorated) in the case of a medical molding part.

When the resin composition comprising the vinyl cyclic hydrocarbon polymer and the above compounding additive is molded under such molding conditions, however, the compounding additive uniformly dispersed in an incompatible state in the resin composition aggregates in the interior of the resulting molded product, and so the particle diameter becomes greater to reduce the surface area Therefore, it is considered that opaque-whitening under high-temperature and high-humidity environment has been unable to be completely prevented.

It has been found that when as molding conditions for solving such a problem, a melt resin temperature upon heating and melting the resin composition to mold it is controlled so as not to exceed 320° C., and the time during which the resin temperature exceeds 250° C. upon residence of the resin composition within a cylinder of a molding machine is controlled within 30 minutes, the incompatible component does not undergo aggregation, so that a sufficient opaque-whitening preventing effect is achieved, and moreover properties such as birefringence, profile irregularities and residual stress can also be retained to provide a molded product well balanced among the various properties.

When, for example, the injection molding process is adopted as molding conditions, the optimum value of a resin temperature varies according to the shape of a molded product formed, the glass transition temperature, molecular weight and molecular weight distribution of the polymer, etc. However, it is generally 220 to 320° C., preferably 230 to 300° C., most preferably 240 to 280° C. Further, the time during which the resin temperature is at least 250° C. upon residence of the resin composition within a cylinder of a molding machine is controlled within generally 30 minutes, preferably 20 minutes, more preferably 15 minutes.

The mold temperature is generally 50 to 180° C., preferably 80 to 150° C. The injection pressure is generally 300 to 2,000 kg/cm$^2$, preferably 600 to 1,500 kg/cm$^2$. The dwell time is generally 1 to 300 seconds, preferably 5 to 150 seconds. The cooling time is generally 20 to 300 seconds, preferably 30 to 150 seconds.

With respect to the above-described molding conditions, the microdomains of the incompatible component undergo aggregation to lower the opaque-whitening preventing effect under high-temperature and high-humidity environment if the cylinder temperature is too high, or the residence time is too long, while the resin composition is not sufficiently plasticized if the resin temperature is too low, or the residence time is too short, whereby residual stress occurs in the resulting molded product to make birefringence great. Accordingly, it is preferred that the resin temperature should fall within the above-described range, since the opaque-whitening preventing performance under high-temperature and high-humidity environment and birefringence of the resulting molded product are balanced with each other at a high level. However, it is preferred that the resin temperature be controlled as low as possible within limits that the birefringence of the molded product is permitted to conduct molding. In particular, when the resin composition obtained by adding the compounding additive incompatible with the hydrogenated product of the vinyl cyclic hydrocarbon polymer to the hydrogenated product is used to mold a medical molded product, it is often effective to control the resin temperature upon molding to lower than 260° C., preferably about 220 to 255° C., more preferably about 230 to 250° C. in order to prevent opaque-whitening by a repeated steam test.

As with the resin temperature, if the mold temperature is too high, the opaque-whitening preventing effect is lowered. If the mold temperature is too low, residual stress occurs in the resulting molded product, which forms the cause of great birefringence. If the dwell time is too long, decomposition, deterioration and the like occur, so that the strength properties of the resulting molded product are deteriorated. If the dwell time is too short, molding shrinkage becomes great. If the cooling time is too long, the opaque-whitening preventing effect is lowered. If the cooling time is too short, residual stress remains in the resulting molded product, which forms the cause of great birefringence. Therefore, it is preferred that these molding conditions should fall within the above-described respective ranges, since the opaque-whitening preventing performance, mechanical strength and birefringence of the resulting molded product are balanced with one another at a high level.

When the resin composition comprises such an organic compound such as the partially etherified product or partially esterified product as described above, the molding conditions may be comparatively widened compared with the composition with the incompatible compounding additive added. However, it is preferred that the above-described respective ranges be adopted.

Molded Product

The molded products according to the present invention are excellent in transparency and undergo no opaque-whitening in a high-temperature and high-humidity test over a long period of time and a repeated steam test. Accordingly, the molded products according to the present invention are particularly suitable for use in application fields of precision optical parts in which opaque-whitening and lowering in transparency under high-temperature and high-humidity environment become a problem, and medical molded products which are subjected to a treatment under high-temperature and high-humidity environment, such as repeated steam sterilization.

In the molded products according to the present invention, the initial light transmittance (a) of each of the molded products at an optional wavelength within a range of 400 to 800 nm and the light transmittance (b) of the molded product after the molded product is held for 1,000 hours in an atmosphere of 65° C. in temperature and 90% in relative humidity satisfy the relationship of the equation (1):

$$[(b)/(a)] \times 100 \geq 70 \qquad (1)$$

In the molded products according to the present invention, the initial light transmittance (a) of each of the molded products at an optional wavelength within a range of 400 to 800 nm and the light transmittance (c) of the molded product after the molded product is subjected to a process of holding the molded product for 20 minutes under steam environment of 121° C. and cooling it back to room temperature repeatedly twice satisfy the relationship of the equation (2):

$$[(c)/(a)]100 \geq 60 \qquad (2)$$

In particular, when the resin composition comprising the vinyl cyclic hydrocarbon polymer and the compounding additive incompatible therewith is used to obtain a molded product, the molding conditions must be strictly controlled so as to provide a molded product satisfying the above-described equations (1) and (2). When the resin composition comprising the vinyl cyclic hydrocarbon polymer and such an organic compound as described above is used to obtain a molded product, a molded product satisfying the above-described equations (1) and (2) can be provided under ordinary molding conditions. The value of $[(b)/(a)] \times 100$ is preferably at least 80, more preferably at least 90, particularly preferably at least 95. In many cases, the value can be controlled to a value close to 99. The value of $[(c)/(a)] \times 100$ is preferably at least 80, more preferably at least 90, particularly preferably at least 95.

Here, the light transmittance at an optional wavelength within a range of 400 to 800 nm is not particularly limited to any of a light transmittance at a specific wavelength within the above wavelength region, light transmittances at all of plural wavelengths, and total light transmittance in a specific wavelength region within the above wavelength region. However, it is generally simple and clear to select a specific wavelength within the above range to conduct measurement.

The molded product according to the present invention are excellent in transmittance. Although its light transmittance varies according to the shape and size of the molded product, etc. When it is used as an aspherical pickup lens for CD player, a lens the light transmittance at 780 nm of which is generally at least 70%, preferably at least 80%, more preferably at least 90% can be provided with ease.

When the resin composition comprising the vinyl cyclic hydrocarbon polymer and the organic compound (partially etherified compound and/or partially esterified compound) is molded into, for example, an optical disk substrate, it can be provided as a molded product excellent in adhesion to metallic recording films.

Optical Part

The optical parts according to the present invention mean optical parts obtained by molding and processing the resin composition, and no particular limitation is imposed on the optical products so far as they are optical parts moldable with the conventionally known plastics. Examples thereof include optical lenses, prisms, optical disk substrates, mirrors, medical inspection cells, light guide plates and optical films.

More specifically, the optical parts according to the present invention are used in a wide variety of application fields, such as whole beam transmission type lenses such as image pickup system lenses in a camera, image pickup system lenses in a video camera, microscope lenses, endoscope lenses, telescope lenses, binocular lenses, spectacle lenses and magnifying lenses; pickup lenses for optical disks such as CD, CD-ROM, WORM (write once optical disk), MO (rewritable optical disk; magneto-optical disk) and MD (minidisk); lenses in a laser scanning system, such as fθ lens and sensor lens for a laser beam printer; and prisms in a finder system of a camera.

Examples of the optical parts according to the present invention include optical lenses such as infrared sensor lenses, auto-focus lenses and band-pass filter lenses, with the above-described absorbent, dye and/or pigment incorporated therein; optical disk substrates for CD, CD-ROM, WORM (write once optical disk), MO (rewritable optical disk; magneto-optical disk), MD (minidisk), DVD (digital video disk), etc.; optical mirrors; prisms; light guide plates for liquid crystal display devices and the like; various kinds of inspection cells, such as medical blood inspection cells; and optical films such as deflecting films, phase difference films and light diffusion films.

Medical Molded Product

The molded products according to the present invention are suitable for use as various kinds of medical transparent molded products of which a repeated steam sterilization treatment, which is conducted under severer high-temperature and high-humidity conditions, is required. As specific examples thereof, may be mentioned containers for liquid, powdery or solid chemicals such as container for liquid chemicals for injection, ampoules, profiled syringes, transfusion bags, containers for solid chemicals, containers for eye drops and container for drops; sample containers such as sampling test tubes for blood inspection, bleeding test tubes and specimen containers; medical devices such as injectors; sterilizing containers for sterilizing medical devices; and medical optical parts such as plastic lenses for drug inspection.

EXAMPLES

The present invention will hereinafter be described more specifically by the following Preparation Examples, Examples and Comparative Examples. All designations of "part" or "parts" and "%" as will be used in these examples mean part or parts by weight and wt. % unless expressly noted.

Various physical properties were determined in accordance with the following methods:
(1) The molecular weight of a polymer sample was measured by GPC using toluene as a solvent to find a weight average molecular weight (Mw) in terms of a standard polystyrene.
(2) The molecular weight distribution of a polymer sample was determined by finding a weight average molecular weight (Mw) and a number average molecular weight (Mn) in terms of standard polystyrene values as measured by GPC using toluene as a solvent, and calculating out a ratio (Mw/Mn) between both values.
(3) The glass transition temperature (Tg) of a polymer sample was measured by a differential scanning calorimeter (DSC).
(4) The hydrogenation rate of aromatic rings was determined by $^1$H-NMR measurement and calculated out.
(5) The high-temperature and high-humidity test was carried out by leaving a molded product sample to stand for 1,000 hours under an environment of 65° C. in temperature and 90% in humidity in a thermo-hygrostatic tester and then rapidly taking the sample out in a room temperature environment (out of the tester) to observe its opaque-whitening state (change in light transmittance at an optional wavelength within a range of 400 to 800 nm; measured a light transmittance at 780 nm in Examples) upon elapsed time of several minutes in the case where the sample was a lens, or to observe the state of a metallic recording film in the case where the sample was an optical disk, thereby conducting evaluation.
(6) The test of resistance to steam sterilization was carried out by repeating a process of holding a molded product sample for 20 minutes under conditions of 120° C. and 1.1 kg/cm$^2$ in saturated vapor pressure in an autoclave and then taking the molded product sample out of the autoclave to measure a change in light transmittance upon elapsed time of several minutes twice in total, thereby conducting evaluation.

Preparation Example 1

Preparation of Hydrogenated Product A1 of Aromatic Vinyl Polymer

A stainless steel-made autoclave having an internal volume of 1 liter and equipped with an electromagnetic stirrer, which had been sufficiently dried and purged with nitrogen, was charged with 320 parts of dehydrated cyclohexane, 80 parts of a styrene monomer and 1.83 parts of dibutyl ether. While stirring the resultant mixture at 40° C. and 400 rpm, 0.31 parts of a n-butyllithium solution (a hexane solution containing 15% of n-butyllithium) were added to initiate polymerization. After the polymerization was conducted for 3 hours under the same conditions, 0.42 parts of isopropyl alcohol were added to stop the reaction. The weight average molecular weight (Mw) and number average molecular weight (Mn) of the thus-obtained aromatic vinyl polymer were measured and found to be 113,636 in Mn and 125,000 in Mw.

To 400 parts of the polymer solution containing the aromatic vinyl polymer were then added and mixed 12 parts of a stabilized nickel hydrogenation catalyst N163A (product of Nippon Chemical Industrial Co., Ltd.; silica-alumina carrier on which 40% nickel was supported), and the resultant mixture was charged into a stainless steel-made autoclave having an internal volume of 1.2 liters and equipped with an electric heater and an electromagnetic stirrer for controlling a hydrogenation reaction temperature. After completion of the charging, the interior of the autoclave was purged with nitrogen gas to conduct a hydrogenation reaction for 8 hours at a temperature of 230° C. and a hydrogen pressure of 45 kg/cm$^2$ while stirring the mixture at a revolution speed of 700 rpm. After completion of the hydrogenation reaction, the hydrogenation catalyst was removed by filtration from the reaction mixture, and 1,200 parts of cyclohexane were then added to the reaction mixture. Thereafter, the resultant mixture was poured into 10 liters of isopropanol to deposit Hydrogenated Product A1 of the aromatic vinyl polymer. Hydrogenated Product A1 was isolated by filtration and then dried by a vacuum dryer to recover Hydrogenated Product A1 of the aromatic vinyl polymer. The physical properties of the thus-obtained Hydrogenated Product A1 were as follows:

Mn=48,421, Mw=92,000, Mw/Mn=1.90; and hydrogenation rate: 100%, and Tg: 140° C.

Preparation Example 2

Preparation of Hydrogenated Product A2

A stainless steel-made autoclave having an internal volume of 1 liter and equipped with an electromagnetic stirrer, which had been sufficiently dried and purged with nitrogen, was charged with 100 parts of a styrene monomer and 0.05 parts of azobisisobutyronitrile to conduct polymerization for 24 hours while stirring the resultant mixture at 70° C. and 400 rpm. After 1,200 parts of cyclohexane were added to the polymerization reaction system, the resultant mixture was poured into 10 liters of isopropanol to deposit a polymer. The polymer was isolated by filtration and then dried by a vacuum dryer to obtain 90 parts of polystyrene. Dissolved in 320 parts of dehydrated cyclohexane were 80 parts of the polymer to conduct a hydrogenation reaction for 12 hours in the same manner as in Preparation Example 1, thereby obtaining Hydrogenated Product A2. The physical properties of the thus-obtained Hydrogenated Product A2 were as follows:

Mn=69,565, Mw=160,000, Mw/Mn=2.30; and hydrogenation rate: 99%, and Tg: 140° C.

Preparation Example 3

Preparation of Hydrogenated Product A3

An experiment was conducted in the same manner as in Preparation Example 2 except that the amount of azobisisobutyronitrile and the polymerization temperature were changed to 0.04 parts and 90° C., respectively, to obtain Hydrogenated Product A3. The physical properties of the thus-obtained Hydrogenated Product A3 were as follows:

Mn=25,556, Mw=92,000, Mw/Mn=3.60; and hydrogenation rate: 99%, and Tg: 139° C.

Examples 1 to 3

Molding of Plastic Lens

To each 100 parts of Hydrogenated Products A1 to A3 of the aromatic vinyl polymers prepared in Preparation Examples 1 to 3 were added 0.2 parts of a rubbery polymer (Toughtec H1052, product of Asahi Chemical Industry Co., Ltd.; glass transition temperature: 0° C. or lower) and 0.05 parts of an antioxidant (Irganox 1010, product of CIBA-GEIGY AG), and the resultant mixtures were separately kneaded in a twin-screw kneader (TEM-35B, manufactured by Toshiba Machine Co., Ltd.; screw diameter: 37 mm, L/D: 32, screw speed: 250 rpm, resin temperature: 240° C., feed rate: 10 kg/hour) and extruded to prepare pellets.

Three pellet samples thus obtained were separately used to mold 3 aspherical pickup lenses for CD player each having an effective diameter of 4.5 mm, a thickness of 3.4 mm and a focal length of 4.5 mm at a clamping force of 30t, a resin temperature of 260° C., a mold temperature of 100° C. and an injection pressure of 900 kg/cm$^2$ by means of an injection molding machine (AUTOSHOTC MODEL 30A; manufactured by Fanac K. K.). The residence time (at a resin temperature of 250° C. or higher) of each resin within a cylinder of the injection molding machine was controlled to 25 minutes. The light transmittances at 780 nm of the lenses thus obtained were all at least 91%.

The thus-obtained 3 pickup lenses were subjected to a high-temperature and high-humidity test to measure their light transmittances at 780 nm. As a result, in each test sample, reduction in light transmittance after the test was within 0.05%, and a value of (light transmittance after the test/light transmittance before the test)×100 was 99%.

Example 4

The pellet sample prepared by using Hydrogenated Product A1 in Example 1 was used to mold an injector cylinder having an outer diameter of 18 mm, an inner diameter of 14 mm, a length of 110 mm and an internal volume of 10 ml was molded under the same injection molding conditions as in Example 1 except that the resin temperature was changed to 250° C. This injector cylinder was used to perform a test of resistance to steam sterilization twice in total to observe changes in transparency. As a result, no change was observed as to the transparency of the cylinder even after performing the second test of resistance to steam sterilization, and a value of (light transmittance after the test/light transmittance before the test)×100 was 99%.

Comparative Example 1

A pickup lens was molded under the same conditions as in Example 1 except that the resin temperature upon injection molding of the pickup lens was changed to 330° C., and then subjected to a high-temperature and high-humidity test to measure a light transmittance thereof. As a result, the opaque-whitening preventing performance of the rubbery polymer was lowered, and the light transmittance was reduced to 62%, and so a value of (light transmittance after the test/light transmittance before the test)×100 was reduced to 68%.

Comparative Example 2

A pickup lens was molded under the same conditions as in Example 1 except that the residence time (at a resin temperature of 250° C. or higher) of the resin within the cylinder upon injection molding of the pickup lens was changed to 40 minutes, and then subjected to a high-temperature and high-humidity test to measure a light transmittance thereof. As a result, the opaque-whitening preventing performance of the rubbery polymer was lowered, and the light transmittance was reduced to 60%, and so a value of (light transmittance after the test/light transmittance before the test)×100 was reduced to 66%.

Comparative Example 3

An injector cylinder was molded under the same conditions as in Example 4 except that the resin temperature upon injection molding of the injector cylinder was changed to 260° C., and then subjected to a test of resistance to steam sterilization twice in total to observe changes in transparency. As a result, no substantial change was observed as to the transparency of the cylinder after performing the first test of resistance to steam sterilization, and a value of (light transmittance after the test/light transmittance before the test)×100 was 90%. However, the transparency of the injector cylinder was quickly lowered after performing the second test of resistance to steam sterilization to cause complete opaque-whitening, and so a value of (light transmittance after the test/light transmittance before the test)×100 was reduced to 50%.

Comparative Example 4

An injector cylinder was molded under the same conditions as in Example 4 except that the residence time (at a resin temperature of 250° C. or higher) of the resin within the cylinder upon injection molding of the injector cylinder was changed to 40 minutes, and then subjected to a test of resistance to steam sterilization twice in total to observe changes in transparency. As a result, no substantial change was observed as to the transparency of the cylinder after performing the first test of resistance to steam sterilization, and a value of (light transmittance after the test/light transmittance before the test)×100 was 90%. However, the transparency of the injector cylinder was quickly lowered after performing the second test of resistance to steam sterilization to cause complete opaque-whitening, and so a value of (light transmittance after the test/light transmittance before the test)×100 was reduced to 45%.

Comparative Example 5

A pellet sample was prepared in the same manner as in Example 1 except that no rubbery polymer was blended upon the pelletizing of Hydrogenated Product Al, and a pickup lens was then molded from the pellet sample to conduct evaluation. As a result, the light transmittance after the high-temperature and high-humidity test was reduced to 60%, and the lens underwent opaque-whitening to become translucent, and so a value of (light transmittance after the test/light transmittance before the test)×100 was reduced to 66%.

Examples 5 to 7

Molding of Plastic Lens

To each 100 parts of Hydrogenated Products A1 to A3 of the aromatic vinyl polymers prepared in Preparation Examples 1 to 3 were added 0.5 parts of poly(oxy-2-hydroxytrimethylene)nonylphenyl ether of a structure that one molecule of nonylphenol was reacted with two molecules of glycidol

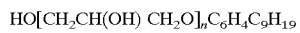
HO[CH$_2$CH(OH) CH$_2$O]$_n$C$_6$H$_4$C$_9$H$_{19}$ wherein n is a natural number and 2 in terms of the average value of the whole molecule, as a partially etherified compound, and 0.05 parts of an antioxidant (Irganox 1010, product of CIBA-GEIGY AG), and the resultant mixtures were separately kneaded in a twin-screw kneader (TEM-35B, manufactured by Toshiba Machine Co., Ltd.; screw diameter: 37 mm, L/D: 32, screw speed: 250 rpm, resin temperature: 240° C., feed rate: 10 kg/hour) and extruded to prepare pellets.

Three pellet samples thus obtained were separately used to mold 3 aspherical pickup lenses for CD player each having an effective diameter of 4.5 mm, a thickness of 3.4 mm and a focal length of 4.5 mm at a clamping force of 30 t, a resin temperature of 260° C., a mold temperature of 100° C. and an injection pressure of 900 kg/cm$^2$ by means of an injection molding machine (AUTOSHOTC MODEL 30A; manufactured by Fanac K. K.). The light transmittances at 780 nm of the lenses thus obtained were all at least 91%.

The thus-obtained 3 pickup lenses were subjected to a high-temperature and high-humidity test to measure their light transmittances at 780 nm. As a result, in each test sample, reduction in light transmittance after the test was within 0.05%, and a value of (light transmittance after the test/light transmittance before the test)×100 was at least 99%.

Example 8

The pellet sample prepared by using Hydrogenated Product A1 in Example 5 was used to mold an injector cylinder having an outer diameter of 18 mm, an inner diameter of 14 mm, a length of 110 mm and an internal volume of 10 ml was molded under the same injection molding conditions as in Example 5. This injector cylinder was then subjected to a test of resistance to steam sterilization twice in total to observe changes in transparency. As a result, no change was visually observed as to the transparency of the cylinder even after performing the second test of resistance to steam sterilization. Even when changes in light transmittance at 780 nm before and after the test were determined, a value of (light transmittance after the test/light transmittance before the test)×100 was 97%.

Example 9

A pellet sample was prepared in the same manner as in Example 5 except that 0.5 parts of 3-(4-nonylphenyloxy)-1,2-propanediol of an etherified compound having a structure that one molecule of nonylphenol was reacted with one molecule of glycidol were added to Hydrogenated Products A1 in place of poly(oxy-2-hydroxytrimethylene) nonylphenyl ether to mold an aspherical pickup lens for CD player having an effective diameter of 4.5 mm, a thickness of 3.4 mm and a focal length of 4.5 mm under the same conditions as in Example 5. The light transmittance at 780 nm of the lens thus obtained was at least 91%.

The thus-obtained pickup lens was subjected to a high-temperature and high-humidity test in the same manner as in Example 5 to measure its light transmittance. As a result, reduction in light transmittance after the test was within 0.05%, and a value of (light transmittance after the test/light transmittance before the test)×100 was at least 99%.

Example 10

The pellet sample prepared by blending poly(oxy-2-hydroxytrimethylene)nonylphenyl ether to Hydrogenated Products A1 in Example 5 was used to conduct injection molding with a molding temperature and a mold temperature preset to 340° C. and 120° C., respectively, by means of an injection molding machine (DISK III) manufactured by Sumitomo Heavy Industries, Ltd. and a mold equipped with a stamper for magneto-optical disk, thereby obtaining a magneto-optical disk substrate having a diameter of 130 mm. (Formation of recording film layer)

ILC-3000 manufactured by ANELVA Corporation was used to form a recording film layer. The structure of the recording film layer was as follows: SiN=100 nm, TbFeCo= 30 nm, SiN=40 nm, and Al=40 nm. No recording film layer was provided 1.0 mm in width at the outer peripheral part and 2.0 mm in width on the outside of a groove at the inner peripheral part.

After the magneto-optical disk obtained in the above-described manner was subjected to an accelerated durability test that a sample is held for 1,000 hours under the same conditions of 65° C. and 90% RH as in the high-temperature and high-humidity test, the surface of the recording film was observed through a light microscope. As a result, no change was observed.

Example 11

A pellet sample was prepared in the same manner as in Example 5 except that 0.5 parts of 3-(behenyloxy)-1,2-propanediol of a structure that one molecule of behenyl alcohol was reacted with one molecule of glycidol were added as a partially etherified compound to Hydrogenated Products A1 in place of poly(oxy-2-hydroxytrimethylene)-nonylphenyl ether, and a magneto-optical disk was then produced in the same manner as in Example 10.

After the magneto-optical disk obtained in the above-described manner was subjected to an accelerated durability test that a sample is held for 1,000 hours under the same conditions of 65° C. and 90% RH as in the high-temperature and high-humidity test, the surface of the recording film was observed through a light microscope. As a result, no change was observed.

Comparative Example 6

A pickup lens was molded in the same manner as in Example 5 except that no poly(oxy-2-hydroxytrimethylene)-nonylphenyl ether was blended upon the pelletizing of Hydrogenated Product A1 in Example 5 to conduct evaluation. As a result, the light transmittance (at 780 nm) after the high-temperature and high-humidity test was reduced to 60%, and the lens underwent opaque-whitening to become translucent, and so a value of (light transmittance after the test/light transmittance before the test)×100 was reduced to 66%.

Comparative Example 7

An injector cylinder was molded in the same manner as in Example 8 except that no poly(oxy-2-hydroxy-trimethylene) nonylphenyl ether was blended upon the pelletizing of Hydrogenated Product A1 in Example 8 to conduct evaluation. As a result, the light transmittance (at 780 nm) after the test of resistance to steam sterilization was reduced to 40%, and the cylinder underwent opaque-whitening to become translucent, and so a value of (light transmittance after the test/light transmittance before the text)×100 was reduced to 44%.

Comparative Example 8

After a magneto-optical disk substrate was molded in the same manner as in Example 10 except that no poly(oxy-2-hydroxytrimethylene)nonylphenyl ether was blended upon the pelletizing of Hydrogenated Product A1 in Example 10, a recording film was formed thereon to conduct evaluation. The surface of the recording film was observed through a light microscope after the high-temperature and high-humidity test. As a result, blister of about 10 microns in diameter was observed.

Examples 12 to 14

Molding of Plastic Lens

To each 100 parts of Hydrogenated Products A1 to A3 of the aromatic vinyl polymers prepared in Preparation Examples 1 to 3 were added 0.1 parts of behenic acid monoglyceride of a structure that one molecule of behenic acid was reacted with one molecule of glycerol

as a partially esterified compound, and 0.05 parts of an antioxidant (Irganox 1010, product of CIBA-GEIGY AG), and the resultant mixtures were separately kneaded in a twin-screw kneader (TEM-35B, manufactured by Toshiba Machine Co., Ltd.; screw diameter: 37 mm, L/D: 32, screw speed: 250 rpm, resin temperature: 240° C., feed rate: 10 kg/hour) and extruded to prepare pellets.

Three pellet samples thus obtained were separately used to mold 3 aspherical pickup lenses for CD player each having an effective diameter of 4.5 mm, a thickness of 3.4 mm and a focal length of 4.5 mm at a clamping force of 30 t, a resin temperature of 260° C., a mold temperature of 100° C. and an injection pressure of 900 kg/cm$^2$ by means of an injection molding machine (AUTOSHOTC MODEL 30A; manufactured by Fanac K. K.). The light transmittances at 780 nm of the lenses thus obtained were all at least 91%.

The thus-obtained 3 pickup lenses were subjected to a high-temperature and high-humidity test to measure their light transmittances at 780 nm. As a result, in each test sample, reduction in light transmittance after the test was within 0.05%, and a value of (light transmittance after the test/light transmittance before the test)×100 was at least 99%.

Example 15

The pellet sample prepared by using Hydrogenated Product A1 in Example 12 was used to mold an injector cylinder having an outer diameter of 18 mm, an inner diameter of 14 mm, a length of 110 mm and an internal volume of 10 ml was molded under the same injection molding conditions as in Example 12. This injector cylinder was then subjected to a test of resistance to steam sterilization twice in total to observe changes in transparency. As a result, no change was visually observed as to the transparency of the cylinder even after performing the second test of resistance to steam sterilization. Even when changes in light transmittance at 780 nm before and after the test were determined, a value of (light transmittance after the test/light transmittance before the test)×100 was 99%.

Example 16

A pellet sample was prepared in the same manner as in Example 12 except that 0.2 parts of pentaerythritol monostearate of a structure that one molecule of stearic acid was reacted with one molecule of pentaerythritol

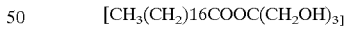

were added to Hydrogenated Products A1 in Example 12 to mold an aspherical pickup lens for CD player having an effective diameter of 4.5 mm, a thickness of 3.4 mm and a focal length of 4.5 mm under the same conditions as in Example 12. The light transmittance at 780 nm of the lens thus obtained was at least 91%.

The thus-obtained pickup lens was subjected to a high-temperature and high-humidity test in the same manner as in Example 12 to measure its light transmittance. As a result, reduction in light transmittance after the test was within 0.05%, and a value of (light transmittance after the test/light transmittance before the test)×100 was at least 97%.

Example 17

The pellet sample prepared by blending behenic acid monoglyceride to Hydrogenated Products A1 in Example 12 was used to conduct injection molding with a molding temperature and a mold temperature preset to 340° C. and 120° C., respectively, by means of an injection molding machine (DISK III) manufactured by Sumitomo Heavy Industries, Ltd. and a mold equipped with a stamper for magneto-optical disk, thereby obtaining a magneto-optical disk substrate having a diameter of 130 mm.

Formation of Recording Film Layer

ILC-3000 manufactured by ANELVA Corporation was used to form a recording film layer. The structure of the recording film layer was as follows: SiN=100 nm, TbFeCo= 30 nm, SiN=40 nm, and Al=40 nm. No recording film layer was provided 1.0 mm in width at the outer peripheral part and 2.0 mm in width on the outside of a groove at the inner peripheral part.

After the magneto-optical disk obtained in the above-described manner was subjected to an accelerated durability test that a sample is held for 1,000 hours under the same conditions of 65° C. and 90% RH as in the high-temperature and high-humidity test, the surface of the recording film was observed through a light microscope. As a result, no change was observed.

Example 18

A pellet sample was prepared in the same manner as in Example 12 except that 0.1 parts of stearic acid monoglyceride of a structure that one molecule of stearic acid was reacted with one molecule of glycerol

were added as a partially esterified compound to Hydrogenated Products A1 in place of behenic acid monoglyceride in Example 12, and a magneto-optical disk was then produced in the same manner as in Example 17.

After the magneto-optical disk obtained in the above-described manner was subjected to an accelerated durability test that a sample is held for 1,000 hours under conditions of 65° C. and 90% RH, the surface of the recording film was observed through a light microscope. As a result, no change was observed like Example 17.

Example 19

A pellet sample was prepared in the same manner as in Example 12 except that 0.2 parts of stearic acid monoglyceride of a structure that two molecules of stearic acid were reacted with one molecule of pentaerythritol

were added as a partially esterified compound to Hydrogenated Products A1 in place of behenic acid monoglyceride in Example 12, and a magneto-optical disk was then produced in the same manner as in Example 17. After the magneto-optical disk thus obtained was subjected to an accelerated durability test that a sample is held for 1,000 hours under conditions of 65° C. and 90% RH, the surface of the recording film was observed through a light microscope. As a result, no change was observed like Example 20

Comparative Example 9

A pickup lens was molded in the same manner as in Example 12 except that no behenic acid monoglyceride was blended upon the pelletizing of Hydrogenated Product A1 in Example 12 to conduct evaluation. As a result, the light transmittance (at 780 nm) after the high-temperature and high-humidity test was reduced to 60%, and the lens underwent opaque-whitening to become translucent, and so a value of (light transmittance after the test/light transmittance before the test)×100 was reduced to 66%.

Comparative Example 10

An injector cylinder was molded in the same manner as in Example 15 except that no behenic acid monoglyceride was blended upon the pelletizing of Hydrogenated Product A1 in Example 15 to conduct evaluation. As a result, the light transmittance (at 780 nm) after the test of resistance to steam sterilization was reduced to 40%, and the lens underwent opaque-whitening to become translucent, and so a value of (light transmittance after the test/light transmittance before the test)×100 was reduced to 44%.

Comparative Example 11

After a magneto-optical disk substrate was molded in the same manner as in Example 17 except that no behenic acid monoglyceride was blended upon the pelletizing of Hydrogenated Product A1 in Example 17, a recording film was formed thereon to conduct evaluation. The surface of the recording film was observed through a light microscope after the high-temperature and high-humidity test. As a result, blister of about 10 microns in diameter was observed.

Industrial Applicability

According to the present invention, there are provided provide resin compositions which can prevent opaque-whitening under high-temperature and high-humidity environment or steam environment over a long period of time and are excellent in transparency, heat resistance and small in birefringence, and molded products formed from such a resin composition. According to the present invention, there are also provided resin composition excellent in the above various properties and also adhesion to metal films, and molded products making use of such a resin composition. The optical parts according to the present invention are particularly suitable for used as optical parts and medical molded products.

What is claimed is:

1. A resin composition comprising (A) at least one vinyl cyclic hydrocarbon polymer selected from the group consisting of hydrogenated products of aromatic vinyl polymers, vinylcyclohexene polymers or hydrogenated products thereof, and vinylcyclohexane polymers, and (B2) an organic compound having at least one alcoholic hydroxyl group and at least one ester linkage.

2. The resin composition according to claim 1, wherein the organic compound having at least one alcoholic hydroxyl group and at least one ester linkage is an anti-opaque-whitening agent.

3. The resin composition according to claim 1, wherein the organic compound having at least one alcoholic hydroxy group and at least one ester linkage is a partially esterified product of a trihydric or higher polyhydric alcohol.

4. The resin composition according to claim 3, wherein the partially esterified product of the trihydric or higher polyhydric alcohol is a compound represented by the formula

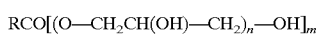

wherein
R is a linear or branched alkyl or alkylene group having 4 to 30 carbon atoms, aryl group, arylene group, novolak condensate residue, or hydrogenated product of the novolak condensate residue, and each of n and m is independently a natural number of 1 or greater.

5. The resin composition according to claim 1, wherein the organic compound having at least one alcoholic hydroxyl group and at least one ester linkage is a compound having an $\alpha,\beta$-diol moiety.

6. The resin composition according to claim 1, wherein the molecular weight of the organic compound having at least one alcoholic hydroxyl group and at least one ester linkage is 100 to 2,000.

7. The resin composition according to claim 1, which comprises the organic compound having at least one alcoholic hydroxyl group and at least one ester linkage in a proportion of 0.01 to 10 parts by weight per 100 parts by weight of the vinyl cyclic hydrocarbon polymer.

8. The resin composition according to claim 1, wherein the organic compound having at least one alcoholic hydroxyl group and at least one ester linkage is a partially esterified product of a polyhydric alcohol.

9. The resin composition according to claim 1, wherein the organic compound having at least one alcoholic hydroxyl group and at least one ester linkage is a partially esterified product of a dihydric alcohol.

10. The resin composition according to claim 9, wherein the dihydric alcohol is polyethylene glycol.

11. The resin composition according to claim 3, wherein the trihydric or higher polyhydric alcohol is glycerol, trimethylolpropane, pentaerythritol, diglycerol, triglycerol, dipentaerythritol, 1,6,7-trihydroxy-2,2-di(hydroxymethyl)-4-oxoheptane, sorbitol, 2-methyl-1,6,7-trihydroxy-2-hydroxymethyl-4-oxoheptane, 1,5,6-trihydroxy-3-oxohexane, or tris(2-hydroxyethyl)isocyanurate.

12. The resin composition according to claim 8, wherein the partially esterified product has, in its molecule, at least one free alcoholic hydroxy group which has not been ester-substituted.

13. The resin composition according to claim 8, wherein the partially esterified product has, in its molecule, 2 to 16 free alcoholic hydroxy groups which have not been ester-substituted.

14. The resin composition according to claim 8, wherein the partially esterified product is such that the alcoholic hydroxyl groups in the polyhydric alcohol have been ester-substituted in a proportion of 10 to 50%.

15. The resin composition according to claim 8, wherein the partially esterified product has, as a substituent group used in esterification, a substituent having 4 to 100 carbon atoms.

16. The resin composition according to claim 8, wherein the partially esterified product has, as a substituent group used in esterification, a substituent having 8 to 30 carbon atoms.

17. The resin composition according to claim 4, wherein the partially esterified product is a single component of a partially esterified compound of glycerol or polyglycerol, and wherein n is 1 to 4 and m is 1 to 6.

18. The resin composition according to claim 4, wherein the partially esterified product is a mixture of a partially esterified compound of glycerol or polyglycerol, and wherein n is 1.0 to 3.0 and m is 1.0 to 6.0, both in terms of the average value of the entire partially esterified component.

19. The resin composition according to claim 1, wherein the molecular weight of the organic compound having at least one alcoholic hydroxyl group and at least one ester linkage is 150 to 1,500.

20. The resin composition according to claim 1, which comprises the organic compound having at least one alcoholic hydroxyl group and at least one ester linkage in a proportion of 0.05 to 5 parts by weight per 100 parts by weight of the vinyl cyclic hydrocarbon polymer.

* * * * *

UNITED STATES PATENT AND TRADEMARK OFFICE
CERTIFICATE OF CORRECTION

PATENT NO.    : 6,498,215 B2
DATED         : December 24, 2002
INVENTOR(S)   : Suzuki et al.

It is certified that error appears in the above-identified patent and that said Letters Patent is hereby corrected as shown below:

Column 32,
Line 51, change "compound-having" to -- compound having --.

Signed and Sealed this

Twenty-second Day of April, 2003

JAMES E. ROGAN
*Director of the United States Patent and Trademark Office*